United States Patent
Xu et al.

(10) Patent No.: US 12,120,633 B2
(45) Date of Patent: Oct. 15, 2024

(54) PAGING FORWARDING FOR A REMOTE WIRELESS DEVICE

(71) Applicant: Apple Inc., Cupertino, CA (US)

(72) Inventors: Fangli Xu, Beijing (CN); Dawei Zhang, Saratoga, CA (US); Haijing Hu, Beijing (CN); Yuqin Chen, Shenzhen (CN); Longda Xing, San Jose, CA (US); Srinivasan Nimmala, San Jose, CA (US); Srirang A. Lovlekar, Cupertino, CA (US); Sethuraman Gurumoorthy, San Jose, CA (US); Murtaza A. Shikari, Mountain View, CA (US); Sree Ram Kodali, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 304 days.

(21) Appl. No.: 17/442,081

(22) PCT Filed: Jul. 21, 2020

(86) PCT No.: PCT/CN2020/103304
§ 371 (c)(1),
(2) Date: Sep. 22, 2021

(87) PCT Pub. No.: WO2022/016381
PCT Pub. Date: Jan. 27, 2022

(65) Prior Publication Data
US 2022/0303942 A1    Sep. 22, 2022

(51) Int. Cl.
*H04W 68/00* (2009.01)
*H04W 76/10* (2018.01)
(Continued)

(52) U.S. Cl.
CPC ......... *H04W 68/005* (2013.01); *H04W 76/10* (2018.02); *H04W 76/20* (2018.02); *H04W 88/085* (2013.01)

(58) Field of Classification Search
CPC ... H04W 68/005; H04W 76/20; H04W 76/10; H04W 88/085
See application file for complete search history.

(56) References Cited

U.S. PATENT DOCUMENTS 10,397,832 B2 *  8/2019  Jung ............... H04W 76/14
10,484,517 B2   11/2019  Cheng et al.
(Continued)

FOREIGN PATENT DOCUMENTS

CN    108207017 A    6/2018
WO    2018031343 A1   2/2018
(Continued)

OTHER PUBLICATIONS

International Search Report for PCT Patent Application No. PCT/CN2020/103304; mailed Apr. 23, 2021.

*Primary Examiner* — Parth Patel
(74) *Attorney, Agent, or Firm* — Kowert, Hood, Munyon, Rankin & Goetzel, P.C.

(57) ABSTRACT

This disclosure relates to techniques for performing paging forwarding for remote wireless devices in a wireless communication system. A relay wireless device and a remote wireless device may establish a relay link. The relay wireless device may provide an indication of the relay link between the relay wireless device and the remote wireless device to a cellular base station. The relay wireless device may receive paging information for the remote wireless device from the cellular base station. The relay wireless device may provide
(Continued)

the paging information to the remote wireless device via the relay link between the relay wireless device and the remote wireless device.

16 Claims, 13 Drawing Sheets

(51) Int. Cl.
*H04W 76/20* (2018.01)
*H04W 88/08* (2009.01)

(56) References Cited

U.S. PATENT DOCUMENTS

| | | | |
|---|---|---|---|
| 10,531,365 B2* | 1/2020 | Kaur | H04W 48/10 |
| 10,638,506 B2 | 4/2020 | Faurie et al. | |
| 10,660,010 B2 | 5/2020 | Aminaka et al. | |
| 10,715,990 B2 | 7/2020 | Huang et al. | |
| 10,743,286 B2* | 8/2020 | Li | H04W 68/08 |
| 11,457,501 B2* | 9/2022 | Xu | H04W 76/18 |
| 11,800,599 B2* | 10/2023 | Baek | H04W 88/04 |
| 2004/0063451 A1* | 4/2004 | Bonta | H04W 88/04 455/518 |
| 2013/0107793 A1* | 5/2013 | Gan | H04W 56/001 370/315 |
| 2017/0353819 A1* | 12/2017 | Yin | H04W 4/70 |
| 2018/0146507 A1* | 5/2018 | Tsuda | H04W 88/04 |
| 2018/0324842 A1* | 11/2018 | Gulati | H04W 72/1263 |
| 2018/0324848 A1* | 11/2018 | Baghel | H04W 88/04 |
| 2018/0324882 A1* | 11/2018 | Gulati | H04W 72/23 |
| 2019/0141771 A1* | 5/2019 | Ma | H04W 76/27 |
| 2019/0261309 A1* | 8/2019 | Martin | H04W 76/11 |
| 2019/0387498 A1* | 12/2019 | Li | H04W 40/12 |
| 2020/0015192 A1* | 1/2020 | Chun | H04W 76/27 |
| 2021/0160956 A1* | 5/2021 | Wang | H04W 40/34 |
| 2021/0315057 A1* | 10/2021 | Baek | H04W 76/10 |
| 2021/0352767 A1* | 11/2021 | Paladugu | H04W 76/11 |
| 2021/0377842 A1* | 12/2021 | Xu | H04W 40/248 |
| 2022/0167263 A1* | 5/2022 | Xu | H04W 40/00 |
| 2022/0225448 A1* | 7/2022 | Li | H04W 60/04 |
| 2022/0295375 A1* | 9/2022 | Wang | H04W 76/14 |
| 2022/0303942 A1* | 9/2022 | Xu | H04W 40/22 |
| 2022/0322283 A1* | 10/2022 | Ji | H04W 76/14 |
| 2022/0338283 A1* | 10/2022 | Wang | H04W 48/10 |
| 2023/0012926 A1* | 1/2023 | Wang | H04W 76/14 |
| 2023/0023639 A1* | 1/2023 | Shi | H04W 88/04 |
| 2023/0026316 A1* | 1/2023 | Chen | H04W 76/14 |
| 2023/0082507 A1* | 3/2023 | McMenamy | H04W 72/20 370/315 |
| 2023/0084017 A1* | 3/2023 | Wang | H04W 76/27 370/311 |
| 2023/0180313 A1* | 6/2023 | Freda | H04W 76/27 370/310 |
| 2023/0224858 A1* | 7/2023 | Cheng | H04W 68/02 455/458 |
| 2023/0224859 A1* | 7/2023 | Cheng | H04W 68/02 455/458 |
| 2023/0284293 A1* | 9/2023 | Hong | H04W 24/04 370/329 |
| 2024/0040426 A1* | 2/2024 | Zhang | H04W 80/02 |

FOREIGN PATENT DOCUMENTS

| | | |
|---|---|---|
| WO | 2018082541 A1 | 5/2018 |
| WO | 2018082869 A1 | 5/2018 |

* cited by examiner

PAGING FORWARDING FOR A REMOTE WIRELESS DEVICE

PRIORITY CLAIM INFORMATION

This application is a U.S. National Stage application of International Application No. PCT/CN2020/103304, filed Jul. 21, 2020, titled "Paging Forwarding for a Remote Wireless Device", which is hereby incorporated by reference in its entirety.

TECHNICAL FIELD

The present application relates to wireless communication, including to paging forwarding for remote wireless devices in a wireless communication system.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. Therefore, improvements in the field are desired.

SUMMARY

Embodiments are presented herein of, inter alia, systems, apparatuses, and methods for performing paging forwarding for remote wireless devices in a wireless communication system.

As noted above, the number of use cases for different classes of wireless devices with widely variable capabilities and usage expectations are growing. One direction in which expansion of possible use cases supported by wireless communication techniques may include toward low cost and/or low power consumption wireless devices. Supporting the capability of such wireless devices to establish radio resource control connections and obtain access to a cellular network by way of an intermediate relay wireless device may increase the utility of such low cost and/or low power consumption wireless devices.

Accordingly, the techniques described herein include techniques for a relay wireless device to forward paging information received from a cellular base station to a remote wireless device via a relay link, among other techniques. The relay wireless device and the remote wireless device may establish the relay link to facilitate communication between the remote wireless device and the cellular base station. The relay wireless device may provide an indication that a relay link has been established between the relay wireless device and the remote wireless device to the cellular base station. The relay wireless device may receive paging information for the remote wireless device from the cellular base station. The paging information may be received using dedicated signaling (e.g., while a radio resource control connection between the relay wireless device and the cellular base station is established), or during a paging occasion configured according to any of various possible timing configurations. For example, the paging occasion timing may be calculated in a manner known to both the relay wireless device and the cellular base station based on identification information for the relay wireless device, or based on identification information for the remote wireless device, among various possibilities. As a further possibility, the relay wireless device may receive paging occasion configuration information for remote wireless devices from the cellular base station, and the paging occasion timing for the paging occasion on which the paging information for the remote wireless device is provided to the relay wireless device may be determined based on the paging occasion configuration information for remote wireless devices.

The relay wireless device may provide the paging information for the remote wireless device to the remote wireless device via the relay link. The paging information may be provided from the relay wireless device to the remote wireless device during a paging occasion for the relay link, which may be configured by the relay wireless device, for example by providing paging occasion configuration information for the relay link to the remote wireless device.

In some instances, the relay wireless device may be able to receive paging information for multiple remote wireless devices from the cellular base station, and forward the paging information for each respective remote wireless device to that respective remote wireless device accordingly.

Techniques for a cellular base station to provide paging information for a remote wireless device to a relay wireless device are also described herein.

The techniques described herein may be implemented in and/or used with a number of different types of devices, including but not limited to cellular phones, tablet computers, accessory and/or wearable computing devices, portable media players, unmanned aerial vehicles, unmanned aerial controllers, automobiles and/or motorized vehicles, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
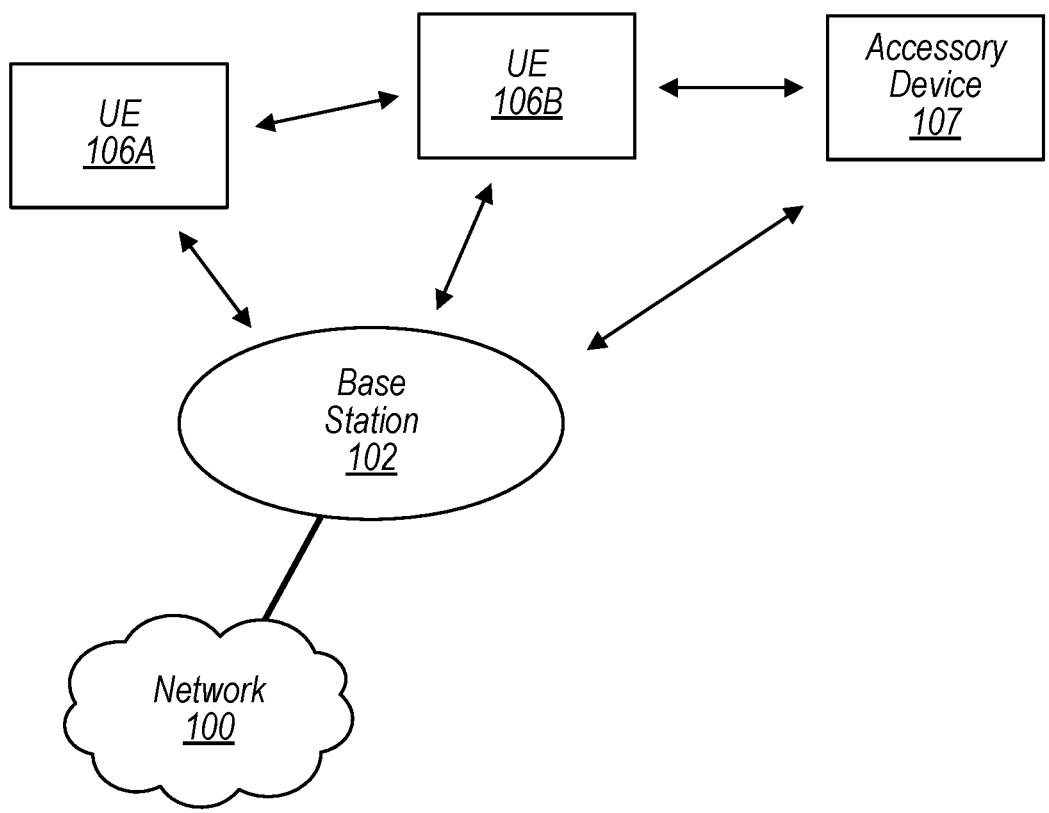
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
UMTS: Universal Mobile Telecommunications System
LTE: Long Term Evolution
NR: New Radio
IoT: Internet of Things

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well as any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
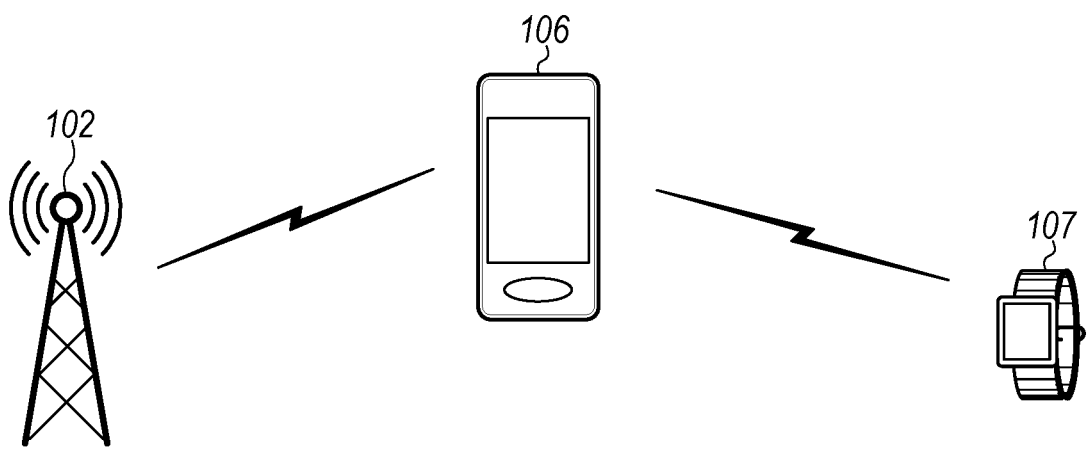
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UE devices 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi. In some instances, the UE 106B and the accessory device 107 may perform direct peer-to-peer communication using proximity services (ProSe) techniques, e.g., in a manner supported by a cellular base station. For example, such ProSe communication may be performed as part of a relay link to support a radio resource control connection between the accessory device 107 and the BS 102, such as according to various embodiments described herein.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, it may be the case that the UE 106A and UE 106B are capable of arranging and performing D2D communication (e.g., including discovery communications) with each other even when out-of-coverage of the BS 102 and other cellular base stations.

FIG. 2 illustrates an example BS 102 in communication with a UE device 106, which in turn is in communication with an accessory device 107. The UE device 106 and accessory device 107 may be any of a mobile phone, a tablet, or any other type of hand-held device, a smart watch or other wearable device, a media player, a computer, a laptop, an unmanned aerial vehicle (UAV), an unmanned aerial controller (UAC), an automobile, or virtually any type of wireless device. In some embodiments, the accessory device may be a wireless device designed to have low cost and/or low power consumption, and which may benefit from use of a relay link with the UE device 106 (and/or another companion device) to support communication with the BS 102. A device that utilizes a relay link with another wireless device to communicate with a cellular base station, such as in the illustrated scenario of FIG. 2, may also be referred to herein as a remote wireless device, a remote device, or a remote UE device, while a wireless device that provides such a relay link may also be referred to herein as a relay wireless device, a relay device, or relay UE device. According to some embodiments, such a BS 102, UE 106, and accessory device 107 may be configured to perform paging forwarding for remote wireless devices in accordance with various of the techniques described herein.

The UE 106 and accessory device 107 may each include a device or integrated circuit for facilitating cellular communication, referred to as a cellular modem. The cellular modem may include one or more processors (processing elements) that is configured to execute program instructions stored in memory, and/or various hardware components as described herein. The UE 106 and/or accessory device 107 may each perform any of the method embodiments described herein by executing such stored instructions.

Alternatively, or in addition, the UE 106 and/or accessory device 107 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or accessory device 107 may include one or more antennas for communicating using one or more wireless communication protocols according to one or more RAT standards. In some embodiments, one or both of the UE 106 or accessory device 107 might be configured to communicate using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Alternatively, the UE 106 and/or accessory device 107 may include two or more radios. For example, in some embodiments, the UE 106 and/or accessory device 107 may include separate transmit and/or receive chains (e.g., including separate antennas and other radio components) for each wireless communication protocol with which it is configured to communicate. As a further possibility, the UE 106 and/or accessory device 107 may include one or more radios that are shared between multiple wireless communication protocols, and one or more radios that are used exclusively by a single wireless communication protocol. For example, the UE 106 and/or accessory device 107 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
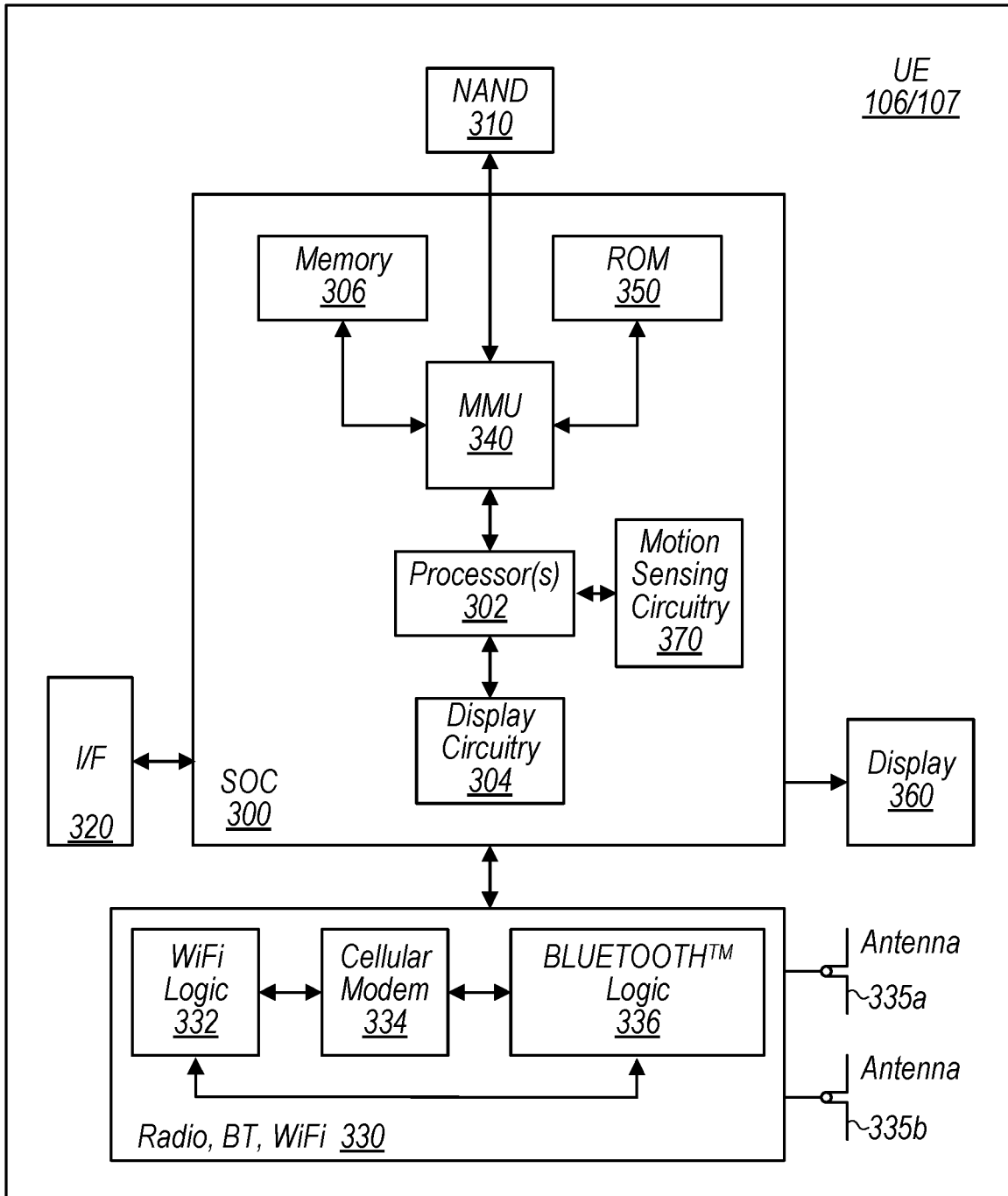
FIG. 3 is a block diagram illustrating an example wireless device, according to some embodiments.

FIG. 3—Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310), and/or to other circuits or devices, such as the display circuitry 304, radio 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using multiple wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. The processor(s) 302 of the UE device 106/107 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform paging forwarding for remote wireless devices according to various embodiments disclosed herein. Processor(s) 302 may also implement various other applications and/or end-user applications running on UE 106. Alternatively or additionally, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
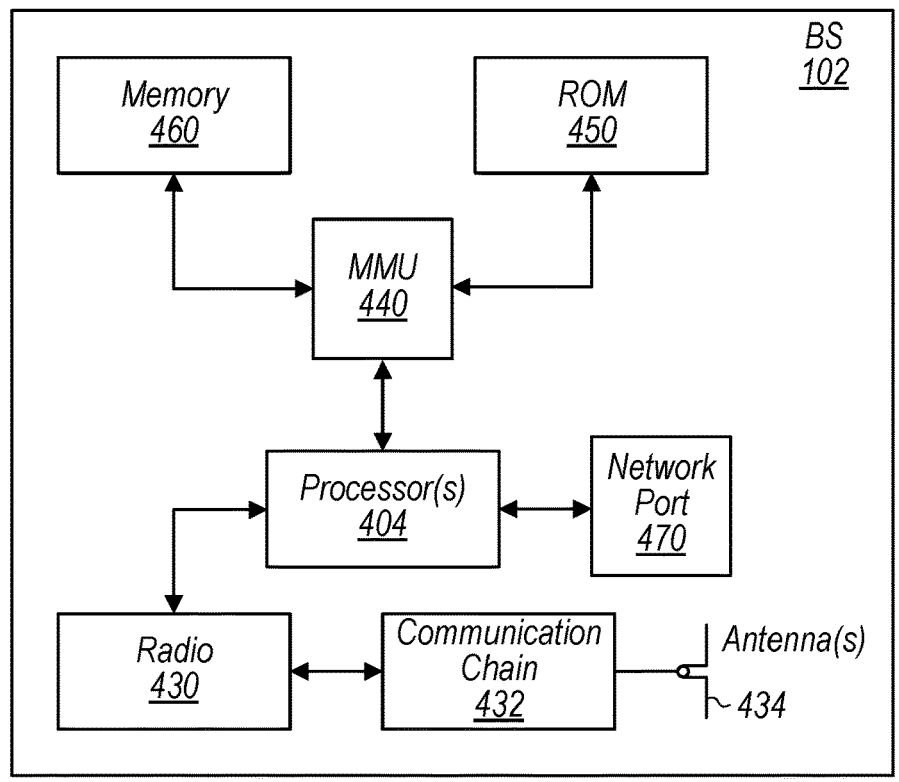
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of paging forwarding for remote wireless devices according to various embodiments disclosed herein, and/or any of various other of the features described herein.

Figure 5:
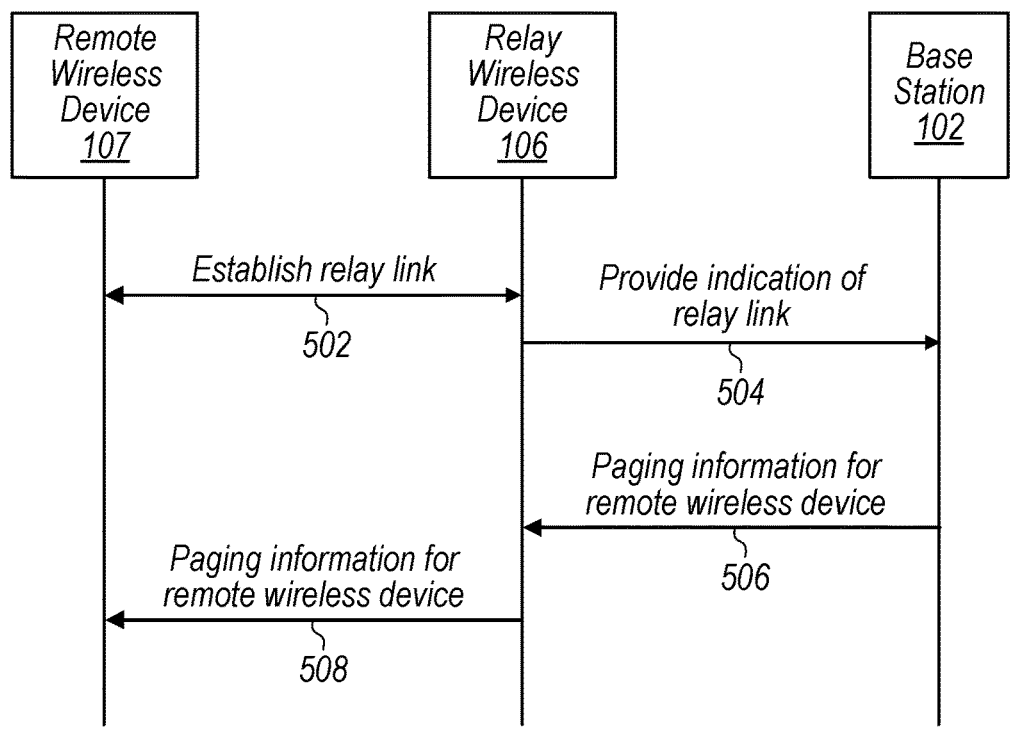
FIG. 5 is a communication flow diagram illustrating an exemplary method for paging forwarding for a remote wireless device in a wireless communication system, according to some embodiments.

FIG. 5—Communication Flow Diagram

FIG. 5 is a communication flow diagram illustrating a method for paging forwarding for remote wireless devices in a wireless communication system, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a wireless device and/or a cellular base station, such as the UEs 106A-B or 107 and/or BS 102 illustrated in and described with respect to FIGS. 1-4, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with LTE, NR, and/or 3GPP specification documents, such description is not intended to be limiting to the disclosure, and aspects of the method of FIG. 5 may be used in any suitable wireless communication system, as desired. As shown, the method may operate as follows.

In 502, a wireless device (a "first wireless device" or a "relay wireless device") 106 may establish a relay link with another wireless device (a "second wireless device" or a "remote wireless device") 107. The relay link may include a device-to-device (D2D) or peer-to-peer (P2P) link, such as a cellular proximity services (ProSe) based wireless link, or any of various other such types of wireless link. According to some embodiments, the relay link may be configured for use for relaying cellular communications between the remote wireless device and a cellular base station 102 via the relay wireless device, for example in a scenario in which the remote wireless device may have more limited wireless communication capability (e.g., battery power constraints, transmission power constraints, etc.) than the relay wireless device such that the remote wireless device may benefit from use of the communication capabilities of the relay wireless device.

The remote wireless device may be any of various types of wireless devices that is capable of performing wireless communication with a cellular base station indirectly via an intermediate relay wireless device. As one possibility, the remote wireless device may be an accessory device, such as a smart watch or other wearable device that is configured to be a low cost and/or low power consumption wireless device. The relay wireless device may be any of various types of wireless devices that is capable of supporting wireless communication between a remote wireless device and a cellular base station by acting as an intermediate relay wireless device. As one possibility, the relay wireless device may be a smart phone capable of acting as a companion device to the remote wireless device. Numerous other types of wireless devices are also possible as the remote wireless device and/or the relay wireless device. The cellular base station may be any of various types of base stations that is capable of performing wireless communication with a remote wireless device indirectly via an intermediate relay wireless device, and that is capable of providing access to a cellular network. As one possibility, the cellular base station may be a 3GPP 5G NR gNB. Alternatively (or additionally), the cellular base station may be capable of operating in accordance with any of various other possible cellular communication standards.

Establishing the relay link may be performed in any of various possible ways. At least according to some embodiments, the relay wireless device may transmit a discovery broadcast message (e.g., based on an event-driven or periodic trigger) indicating that the relay wireless device is capable of providing a relay link with a cellular base station for a remote wireless device. The remote wireless device may receive the discovery broadcast message from the relay wireless device (and potentially may receive discovery broadcast messages from one or more other wireless devices capable of supporting a relay link with a cellular base station). The remote wireless device may perform link selection to determine a wireless device with which to attempt to establish a relay link for relaying cellular communications between the remote wireless device and a cellular base station, and may select the relay wireless device based at least in part on the discovery broadcast message received from the relay wireless device.

Based on selecting the relay wireless device, the remote wireless device may provide an access request to the relay wireless device, which may include any of various possible types of information (e.g., wireless device identification information, requested relay link configuration parameters, etc.). If the relay wireless device accepts the access request, it may provide an indication that the access request is accepted, which may similarly include any of various possible types of information (e.g., relay link identification information, relay link configuration parameters, etc.). Note that numerous alternatives and/or variations to this example procedure for establishing the relay link are also possible.

In 504, the relay wireless device may provide an indication of the relay link to the cellular base station. This may include providing any of various possible types of information about the relay link and/or the remote wireless device, in any of various possible ways. At least in some instances, this may include providing access information for the remote wireless device to facilitate access by the remote wireless device to a cellular network accessible via the cellular base station. The indication may be configured, at least in part, to facilitate provision of paging information intended for the remote wireless device to the relay wireless device, e.g., to be forwarded to the remote wireless device via the relay link established between the relay wireless device and the remote wireless device. In other words, at least according to some embodiments, the remote wireless device, the relay wireless device, and the cellular base station may configure an arrangement in which the cellular base station provides paging information to the remote wireless device indirectly by way of the relay wireless device. Such an arrangement may allow the remote wireless device to recive cellular paging information that it might not otherwise be able to receive (e.g., due to wireless communication capability constraints), and may be used in conjunction with other such wireless communication relaying techniques to support the performance of cellular communication between a remote wireless device and a cellular base station even when the remote wireless device and the cellular base station are not able to directly communicate with each other, at least according to some embodiments.

In 506, the cellular base station may provide paging information for the remote wireless device to the relay wireless device, e.g., in accordance with the paging information relaying arrangement configured between the remote wireless device, the relay wireless device, and the cellular base station. At least according to some embodiments, the paging information may include one or more paging messages and/or other information configured for delivery to the remote wireless device while the remote wireless device is operating in a radio resource control (RRC) idle or RRC inactive mode. For example, the paging information could include one or more downlink and/or uplink grants, and/or other information indicating to (re-)establish a RRC connection to perform data communication with the cellular network, among various possibilities.

The paging information for the remote wireless device may be provided to the relay wireless device in any of a variety of possible ways and/or times. As one possibility, the paging information for the remote wireless device may be provided from the cellular base station to the relay wireless device via dedicated signaling while a RRC connection is established between the relay wireless device and the cellular base station. As another possibility, the paging information for the remote wireless device may be provided from the cellular base station to the relay wireless device during a paging occasion configured based on identification information for the remote wireless device. For example, in such a scenario, the relay wireless device may receive paging information for the remote wireless device on a different paging occasion than the relay wireless device receives paging information for itself. As a further possibility, the paging information for the remote wireless device may be provided from the cellular base station to the relay wireless device during a paging occasion configured based on identification information for the relay wireless device. In such a scenario, it may be the case that the relay wireless device receives paging information for the remote wireless device on the same paging occasion than the relay wireless device receives paging information for itself. As a still further possibility, the cellular base station may provide paging occasion configuration information for remote wireless devices to the relay wireless devices, and the paging information for the remote wireless device may be provided from the cellular base station to the relay wireless device during a paging occasion configured according to the paging occasion configuration information for remote wireless devices.

Note that any of these approaches may also be used in case the relay wireless device provides cellular communication relaying service to multiple remote wireless device. For example, the relay wireless device could also establish another relay link with another remote wireless device, provide an indication of that relay link to the cellular base station, and receive paging information for that remote wireless device from the cellular base station during a paging occasion configured according to any of identification information for that remote wireless device, identification information for the relay wireless device, or paging occasion configuration information for remote wireless devices.

In 508, the relay wireless device may provide the paging information to the remote wireless device. The paging information may be provided in any of various possible ways. As one possiblity, the paging information may be provided from the relay wireless device to the remote wireless device during a paging occasion configured according to paging occasion configuration information for the relay link between the relay wireless device and the remote wireless device. Such paging occasion configuration information for the relay link between the relay wireless device and the remote wireless device may be provided by the relay wireless device to the remote wireless device, e.g., when establishing the relay link. The paging occasion configuration information could include explicit indication of one or more paging occasions, and/or an implicit indication of one or more paging occasions, for example including information based on which the remote wireless device may be able to determine when paging occasions for the relay link are scheduled. For example, in some instances, paging occasions may be scheduled based on the relay link identification information, which may be provided during relay link establishment, in a manner that is known (e.g., specified according to 3GPP or otherwise mutually agreed upon) to both the remote wireless device and the relay wireless device.

Based on the paging information, it may be possible for the remote wireless device to receive downlink communications from the cellular base station, transmit uplink communications to the cellular base station, and/or otherwise perform cellular communication with the cellular base station, in accordance with any downlink grants, uplink grants, and/or other information provided in the paging information. Such subsequent communication may be performed directly between the remote wireless device and the cellular base station, or indirectly via the relay wireless device, according to various embodiments.

Thus, using the techniques described herein, it may be possible for a remote wireless device to receive paging messages from a cellular network via a relay wireless device. Such techniques may (possibly in conjunction with other techniques for relaying wireless communications between a remote wireless device and cellular basse station via a relay wireless device) be useful for supporting cellular communication for a broader range of types of wireless devices, e.g., potentially helping to extend the range of possible wireless devices capable of utilizing cellular communication further towards lower cost and/or lower power consumption wireless devices, among other possible benefits, at least according to some embodiments.

FIGS. 6-15 and Additional Information

FIGS. 6-15 and the following additional information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

Figure 6:
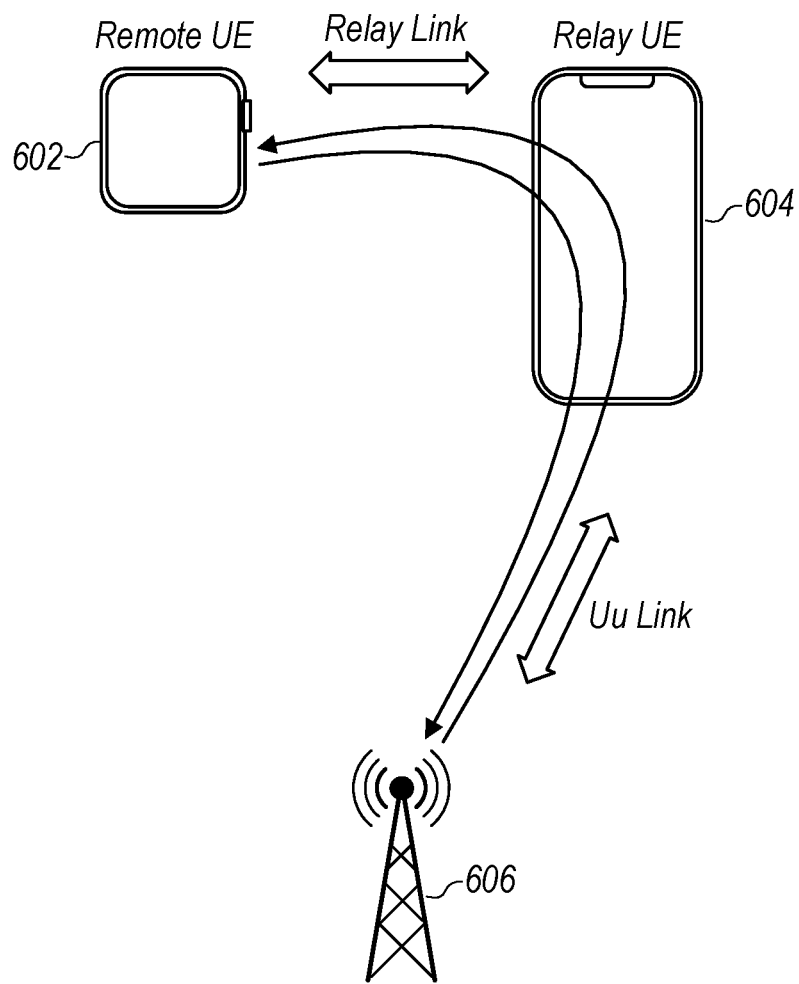
FIG. 6 illustrates aspects of a possible wireless communication relay between a remote UE, a relay UE, and a gNB, according to some embodiments.

3GPP 5G NR cellular communication techniques are being developed for a variety of use cases, including enhanced mobile broadband (eMBB), ultra reliable low latency communications (URLLC), and massive machine type communication (mMTC). The mMTC use case may include widespread deployment of wireless devices designed to have relatively low cost and/or low power consumption. Such devices may include wearable devices, appliances, process control devices, measurement devices, and/or any of a variety of other types of devices. In at least some embodiments (e.g., wearable devices, in some instances), it may be the case that such a device may commonly be within relatively close proximity to another wireless device (e.g., a smart phone, in some instances) that can serve as a relay for communications with a cellular network. Accordingly, it may be beneficial, at least in some embodiments, to support a UE to NW communication relay framework, e.g., to help support operation of low cost and/or low power consumption wireless devices that may be capable of benefiting from such a framework. For example, FIG. 6 illustrates aspects of one possible example wireless communication relay between a remote UE 602, a relay UE 604, and a cellular base station 606. As shown, in the illustrated scenario the remote UE 602 may be able to communicate with the cellular base station 606 by way of a relay link between the remote UE 602 and the relay UE 604 as well as a Uu link between the relay UE 604 and the cellular base station 606.

Figure 7:
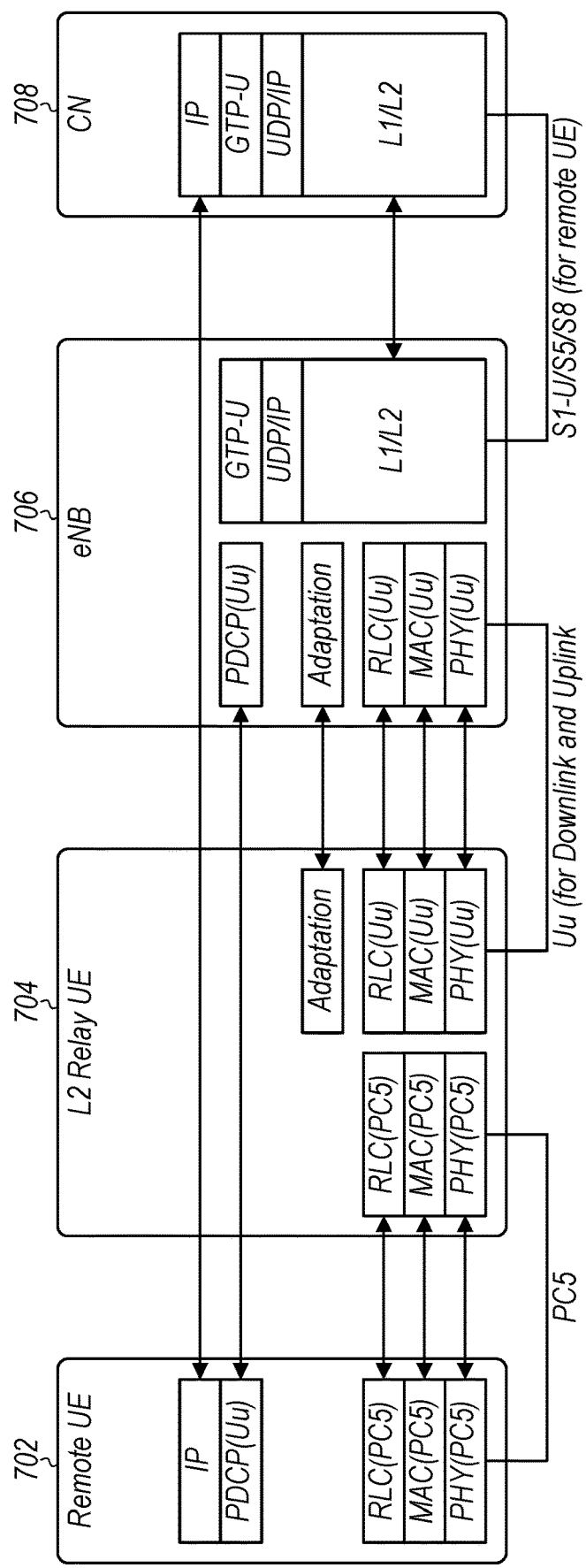
FIGS. 7-8 illustrate exemplary aspects of possible protocol stack architectures for user plane and control plane communications in a 3GPP based UE-to-network relay framework, according to some embodiments.
Figure 8:
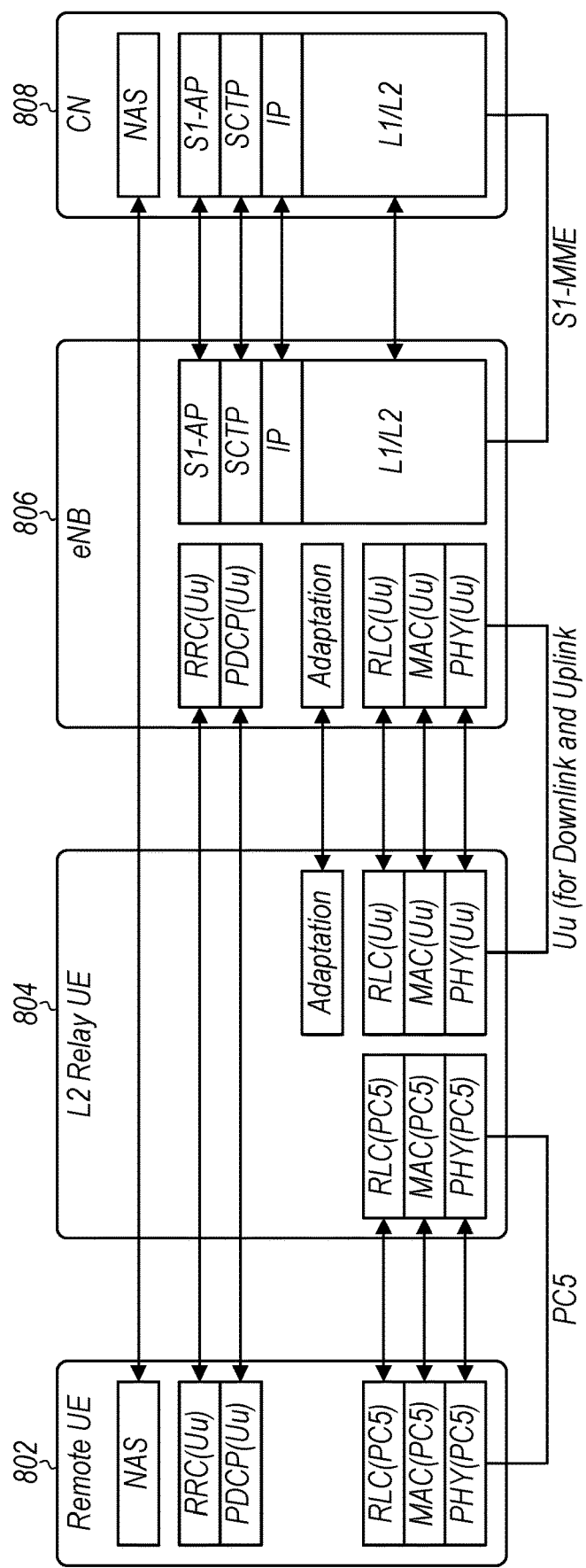

According to various embodiments, there may be multiple possible types of UE to NW relay frameworks. As one possibility, a layer 3 relay may be used, which may be implemented without impact to access stratum communication layers, at least in some instances. As another possibility, a layer 2 relay may be used, for example by establishing and maintaining a radio resource control connection that is terminated between the remote UE and the cellular base station. FIGS. 7-8 illustrate exemplary aspects of possible protocol stack architectures for user plane and control plane communications in a 3GPP based UE-to-network relay framework in which the communication relay is implemented at layer 2, according to some embodiments.

More particularly, FIG. 7 illustrates the user plane radio protocol stack for a layer 2 UE to network relay that utilizes a PC5 interface between a remote UE 702 and a relay UE 704 to provide a communication link between the remote UE 702 and an eNB 706, and to a core network 708 to which the eNB 706 provides access. Similarly, FIG. 8 illustrates the control plane radio protocol stack for a layer 2 UE to network relay that utilizes a PC5 interface between a remote UE 802 and a relay UE 804 to provide a communication link between the remote UE 802 and an eNB 806, and to a core network 808 to which the eNB 806 provides access. As shown, the relaying may be performed above the RLC sublayer. The Uu PDCP and RRC links may be terminated between the remote UE and the eNB, while RLC, MAC, and PHY, and the non-3GPP transport layers, are terminated in each link (e.g., the link between the remote UE and the relay UE, and the link between the relay UE and the eNB).

According to some embodiments, cellular communication systems may utilize a paging mechanism for providing notifications to UE devices while they are in RRC idle or inactive mode. According to such a paging mechanism, at least as one possibility, a UE device may be configured to monitor a paging channel during certain specified paging occasions while operating in RRC idle or inactive, and the cellular base station serving the UE may provide any paging information for the UE device during those paging occasions. The paging occasions may be derived, both by the UE and by the cellular base station according to one or more formulas, which may be based at least in part on identification information for the UE. For example, as one possibility, it may be the case that the paging frame (PF) in which one or more paging occasions (POs) occur for a UE can de derived using the following formula, e.g., in accordance with 3GPP TS 36.304:

$$PF=(SFN+PF\_\text{offset}) \bmod T=(T \text{ div } N)*(UE\_ID \bmod N)$$

Further, it may be possible that the paging occasion(s) (e.g., the set(s) of PDCCH monitoring occasions in which paging downlink control information can be sent, which can each include multiple time slots) within such a paging frame can be derived using the following formula, e.g., in accordance with 3GPP TS 36.304:

$$PO=i\_s-\text{floor}(UE\_ID/N) \bmod Ns$$

Note that in multi-beam operations, the length of one paging occasion may include one period of beam sweeping, and the UE may be able to assume that the same paging message is repeated in all beams of the sweeping pattern, at least according to some embodiments. Such a paging mechanism may support for the first PDCCH monitoring occasion of each paging occasion in a paging frame to be configured, e.g., for configuration flexibility, at least in some instances.

Note that at least some paging parameters may differ for different operating modes. For example, in some instances, core network (CN) initiated paging may be supported in RRC idle, using 5G-S-TMSI as the UE ID for paging. In such instances, the paging discontinuous reception (DRX) cycle may be the shortes of a default cycle or a UE specific cycle configured via non access stratum (NAS) signaling, at least as one possibility. As another example, in some instances, radio access network (RAN) initiated paging may be supported in RRC inactive, using I-RNTI as the UE ID for paging. In such instances, the paging DRX cycle may be the shortes of a default cycle, a UE specific cycle configured via NAS signaling, or a RAN specific cycle configured via RRC signaling, at least as one possibility.

Figure 9:
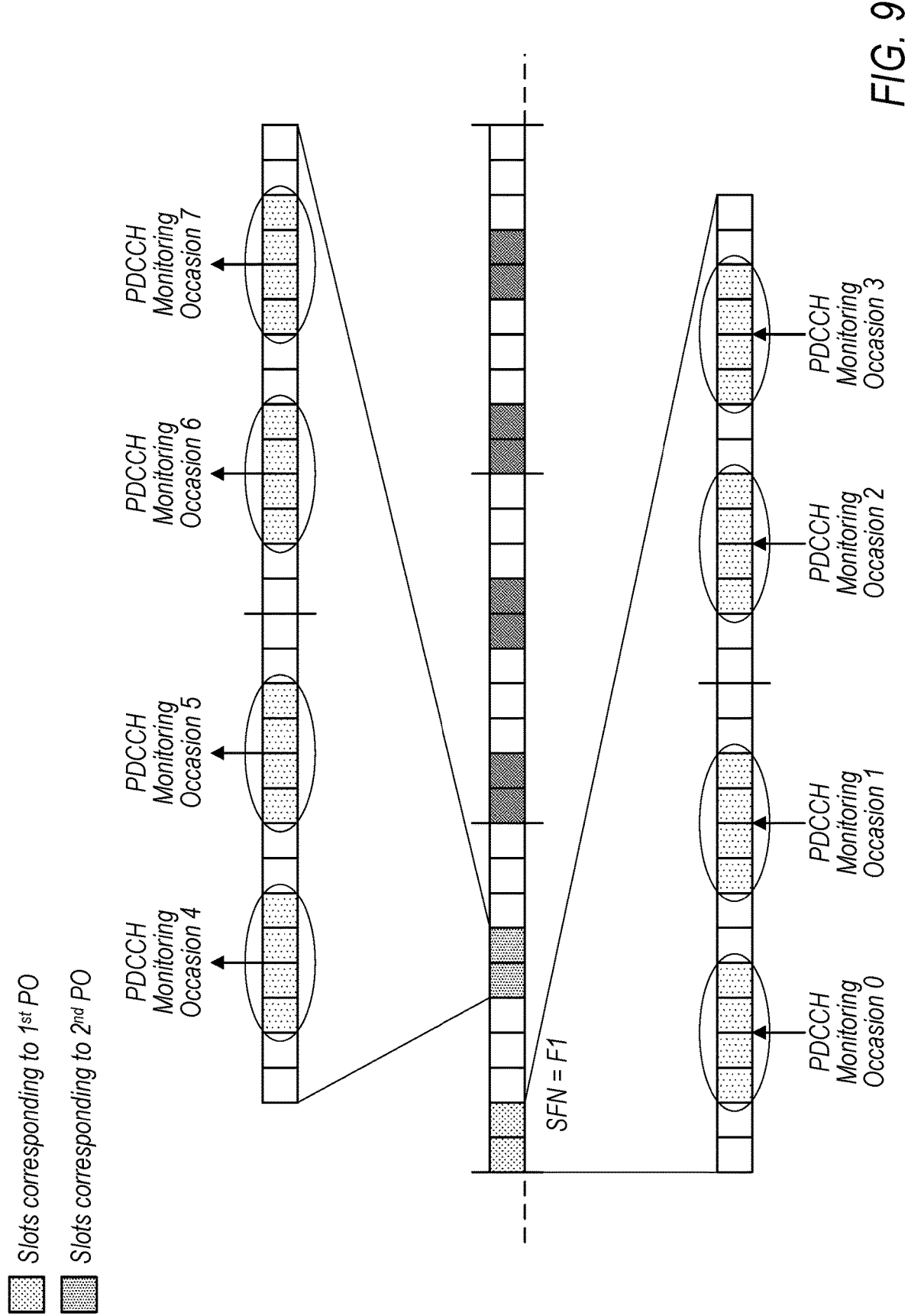
FIGS. 9-10 illustrate exemplary aspects of a possible paging mechanism in a wireless communication system, according to some embodiments.
Figure 10:
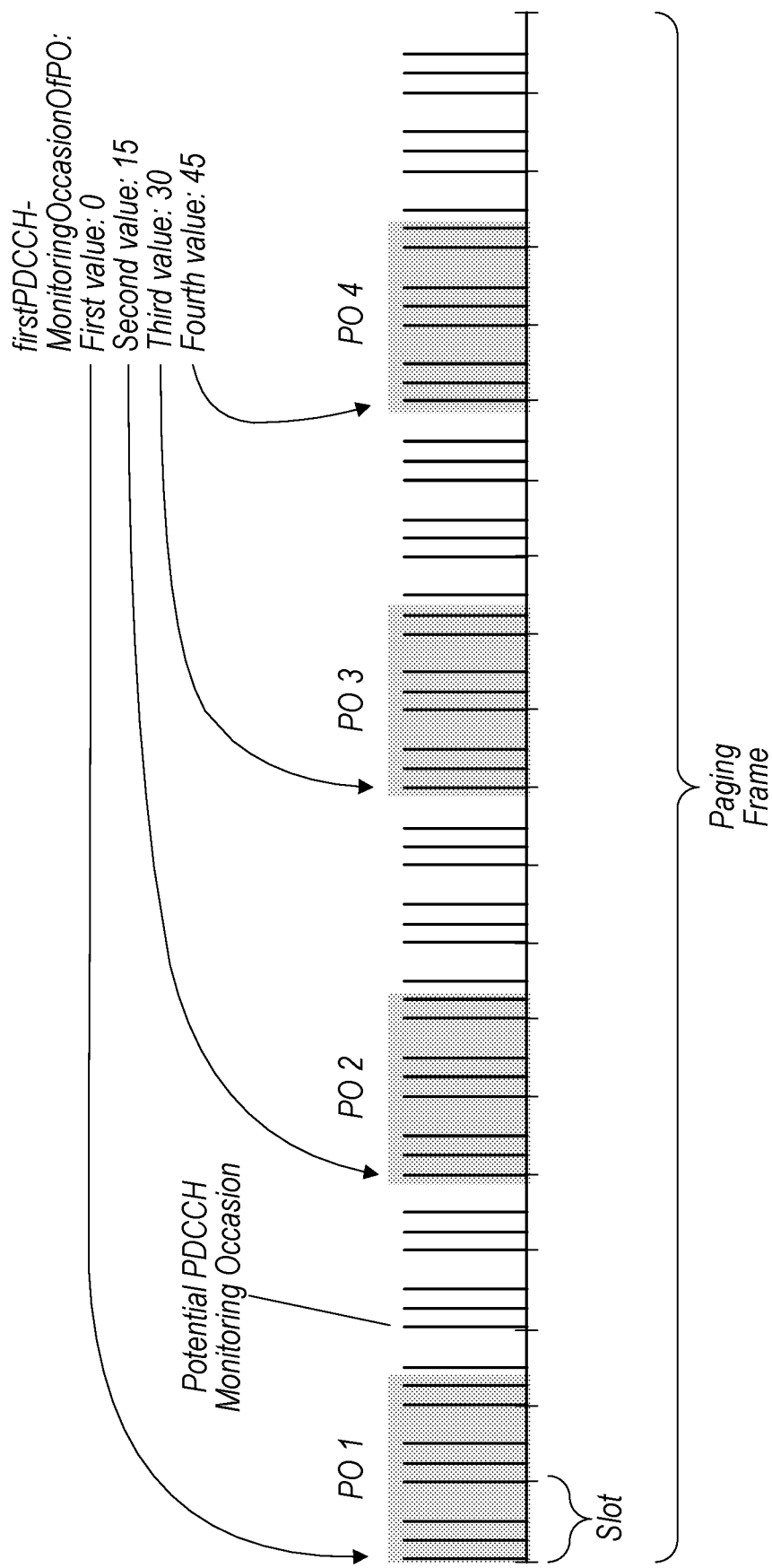

FIGS. 9-10 illustrate exemplary aspects of such a possible paging mechanism in a wireless communication system, according to some embodiments. As shown, in the example scenario illustrated in FIG. 9, a UE may be configured with two paging occasions in a paging frame, each of which may inlcude four PDCCH monitoring occasions. Such a paging configuration may be configured using paging-SearchSpace configuration (Periodicity: 5 slots; Offset: 0; duration: 2 slots; monitoringSymbolsWithinSlot: 00100000100000; CORESET-time-duration: 4 OFDM symbols); nB—2T; Reference Frame determined by UE: SFN 'F1'; Number of SSBs=4; i_s=0 indicating PDCCH monitoring occasion 0, 1, 2, 3 for 1st PO; and i_s=1 indicating PDCCH monitoring occasion 4, 5, 6, 7 for 2nd PO, at least according to some embodiments. FIG. 10 illustrates a further example of a possible configuration of groups/bursts of PDCCH monitoring occasions forming paging occasions within a paging frame, e.g., in which an index value associated with the first PDCCH monitoring occasion of a paging occasion can be used to determine and/or indicate a configured paging occasion within a paging frame.

For a direct cellular link between a wireless device and a cellular base station, paging may be delivered by the network via a Uu link. The wireless device may perform monitoring for paging during the paging opportunities for the wireless device, e.g., as calculated based on its 5G-S-TMSI during its idle DRX cycle, such as illustrated in and described with respect to the exemplary scenarios of FIGS. 9-10. In the case of L2 UE-to-NW relay, it may be possible for the relay UE to forward or relay the paging received from the network for the remote UE to the remote UE via relay link. However, such a paging forwarding mechanism by a relay UE is not currently specified in 3GPP standards. Accordingly, it may be beneficial to provide such a paging forwarding mechanism for remote wireless devices.

The paging forwarding mechanism may allow an idle or inactive remote UE to receive paging messages from its linked relay UE. In particular, at least according to some embodiments, if the remote UE is linked to a relay UE, the remote UE could receive the paging via the relay link from the relay UE. The remote UE could monitor the paging via the relay link at relay link paging occasions, e.g., which may be allocated by the relay UE or calculated based on the remote UE's relay link ID or its S-TMSI. The relay UE may receive the remote UE's paging from the network, and forward it to the remote UE via relay link. The relay UE may only monitor and forward the paging for a linked remote UE in the Uu link; the relay UE may be aware of the linked idle/inactive remote UE.

There may be several options for when and how the relay UE receives paging for a linked remote UE in the Uu link from the network side. As one possibility, the network may transmit the remote UE's paging via dedicated signaling to the linked relay UE, e.g., if the relay UE is operating in RRC connected. As another possibility, the network may transmit the remote UE's paging during a paging occasion, where the paging occasion is calculated based on the remote UE ID. As a further possibility, the network may transmit the remote UE's paging during a paging occasion, where the paging occasion is calculated based on the relay UE ID. As a still further possibility, the network may transmit the remote UE's paging during a special paging occasion configured for the relay UE to perform paging reception for linked remote UEs. Other techniques are also possible.

Figure 11:
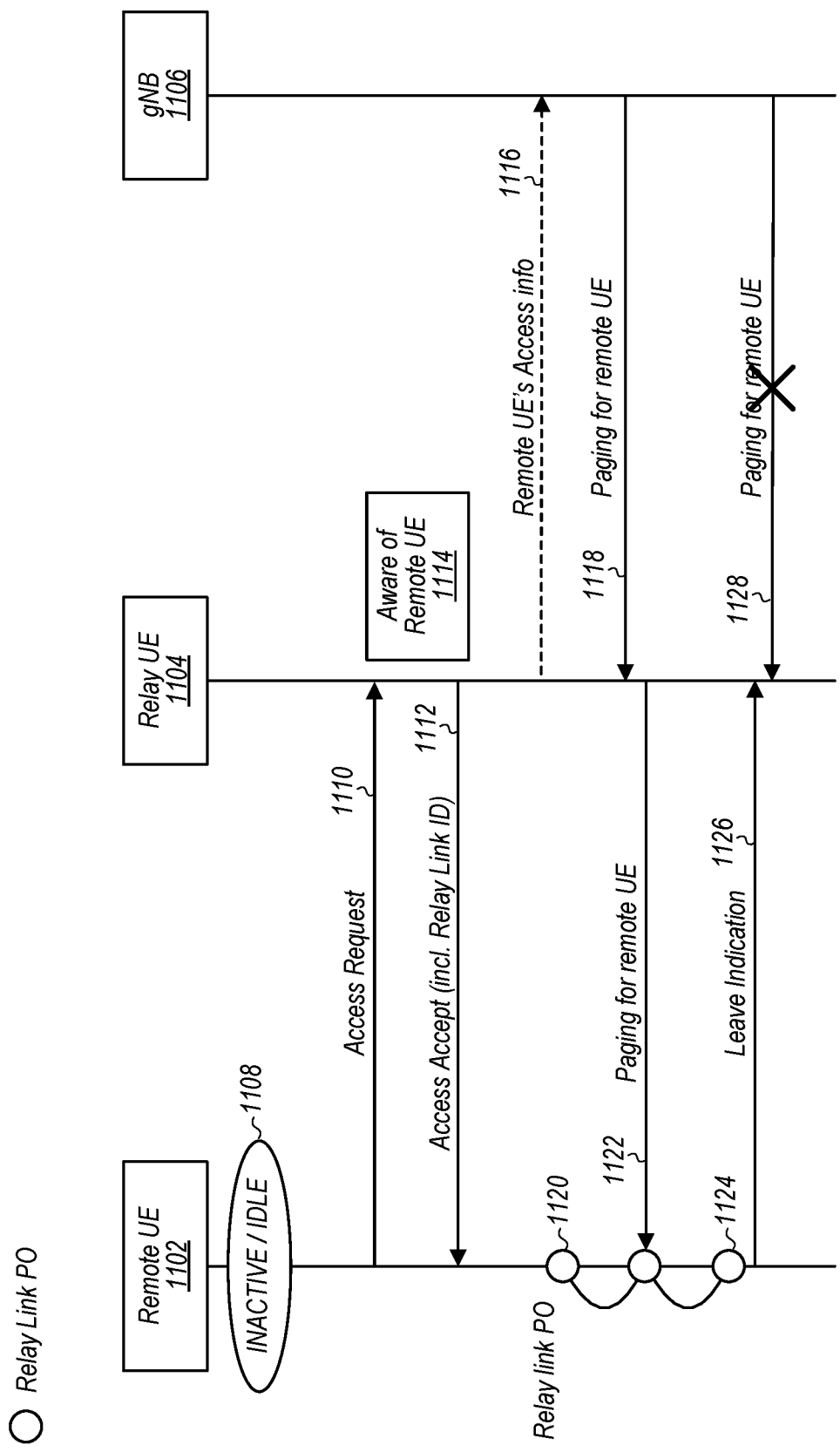
FIGS. 11-15 are signal flow diagrams illustrating aspects of various possible example scenarios for performing paging forwarding for a remote wireless device in a wireless communication system, according to some embodiments.

FIGS. 11-15 are signal flow diagrams illustrating further details of various possible such paging forwarding techniques. FIG. 11 illustrates aspects of an example scenario in which a relay UE 1104 receives paging for a remote UE 1102 from a gNB 1106 via a Uu link, and forwards the paging to the remote UE 1102 via a relay link, according to some embodiments. As shown, in the illustrated scenario, in 1108, the remote UE may be operating in RRC inactive or RRC idle. In 1110, the remote UE may provide an access request to the relay UE, e.g., to establish a relay link for communicating with the gNB. In 1112, the relay UE may accept the access request, including providing various relay link configuration information, such as relay link identification information, e.g., which may be used to determine when paging occasions for the relay link are scheduled. Note that the paging occasion distribution on the Uu link and the relay link could be different, e.g., as described further herein with respect to FIGS. 12-15. Having established the relay link, in 1114, the relay UE may be aware of the remote UE, and in 1116, may provide the remote UE's access information to the gNB. Based on the information provided regarding the remote UE, in 1118, when the gNB has paging information for the remote UE, it may provide the paging information to the relay UE. In 1120, 1122, and 1124, during relay link paging occasions, the remote UE may monitor the relay link for paging information. In 1122, the relay UE may forward the paging information received from the gNB to the remote UE, and so the remote UE may receive the paging information during that relay link paging occasion. In 1126, the remote UE may provide a leave indication to the relay UE. In 1128, the gNB may attempt to provide further paging information for the remote UE to the relay UE, but as the remote UE may no longer be linked to the relay UE, it may be the case that the relay UE stops forwarding paging to the remote UE and only monitors its own paging in the Uu link.

Figure 12:
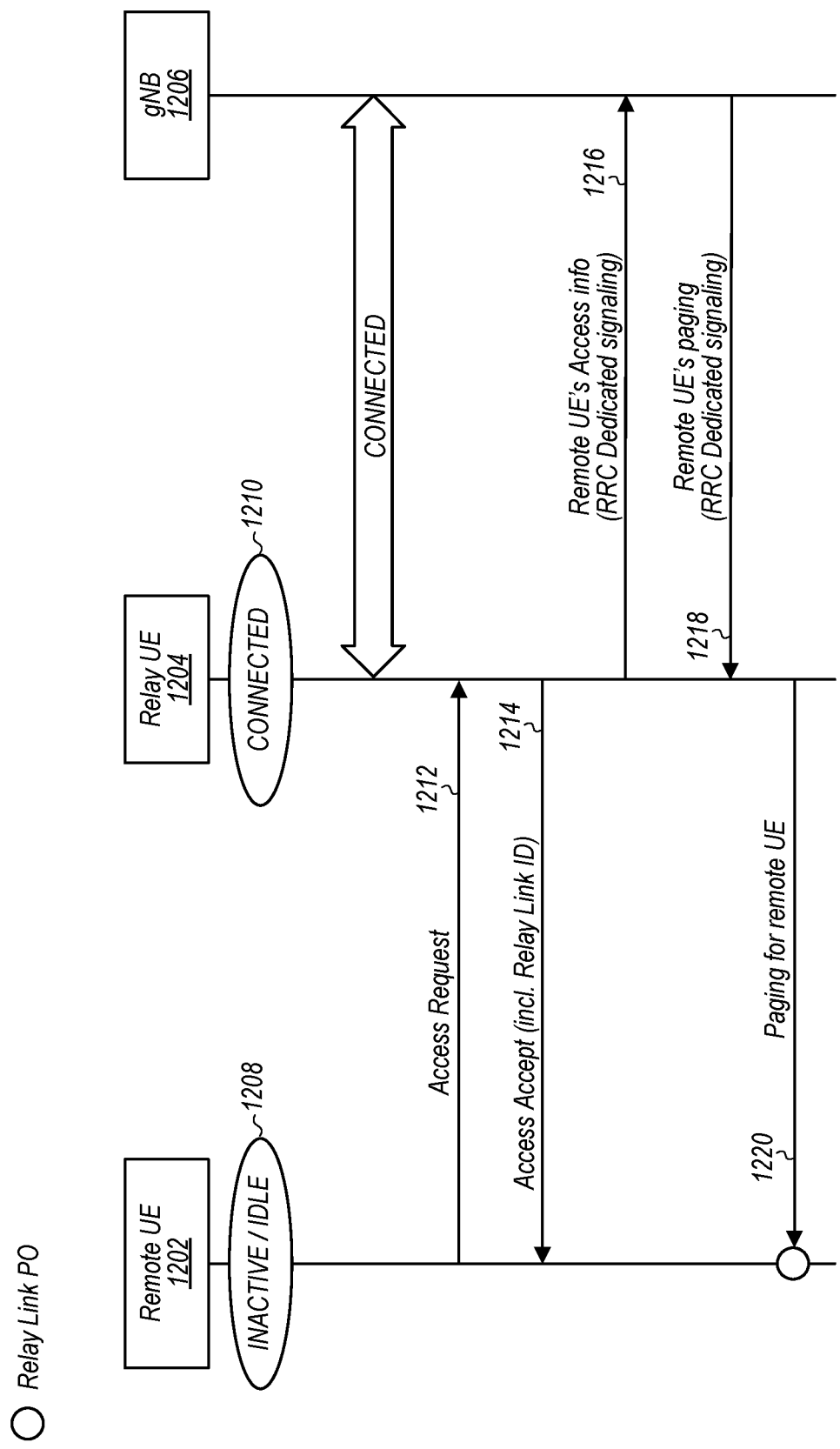

FIG. 12 illustrates aspects of an example scenario in which a relay UE 1204 receives paging for a remote UE 1202 from a gNB 1206 via a Uu link via RRC dedicated signaling, and forwards the paging to the remote UE 1202 via a relay link, according to some embodiments. As shown, in the illustrated scenario, the remote UE may be operating in RRC inactive or RRC idle (1208), while the relay UE may be operating in RRC connected (1210). In 1212, the remote UE may provide an access request to the relay UE, e.g., to establish a relay link for communicating with the gNB. In 1214, the relay UE may accept the access request, including providing various relay link configuration information, such as relay link identification information. Having established the relay link, in 1216, the relay UE may be aware of the remote UE, and may provide the remote UE's access information to the gNB (e.g., via RRC dedicated signaling). Based on the information provided regarding the remote UE, in 1218, when the gNB has paging information for the remote UE, it may provide the paging information to the relay UE via RRC dedicated signaling. In 1220, during a relay link paging occasion, the relay UE may forward the paging information received from the gNB to the remote UE. The remote UE may monitor the relay link for paging information during the relay link paging occasion, and so the remote UE may receive the paging information.

Figure 13:
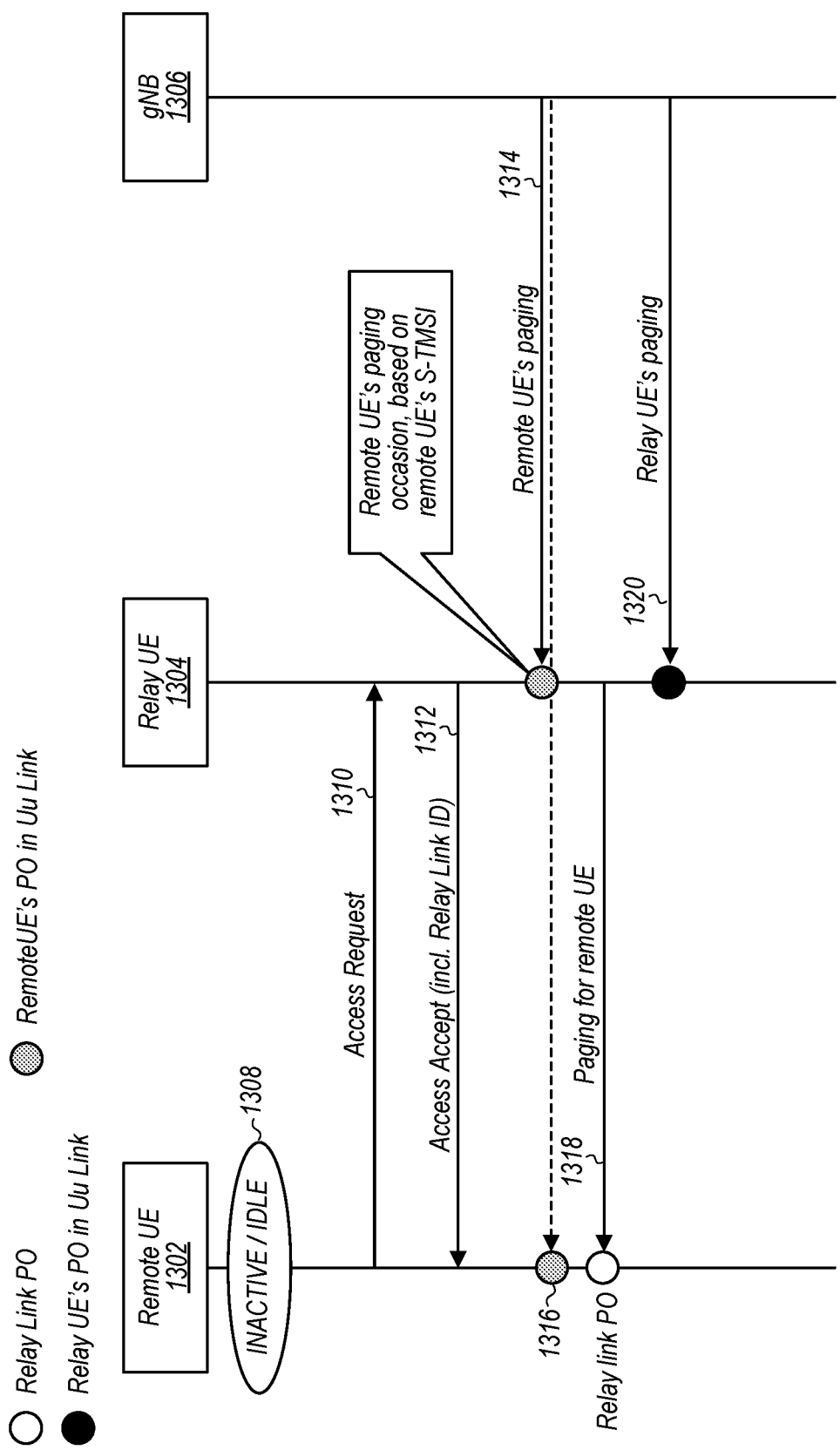

FIG. 13 illustrates aspects of an example scenario in which a relay UE 1304 receives paging for a remote UE 1302 from a gNB 1306 via a Uu link during a paging occasion calculated based on the UE ID of the remote UE 1302, and forwards the paging to the remote UE 1302 via a relay link, according to some embodiments. As shown, in the illustrated scenario, in 1308, the remote UE may be operating in RRC inactive or RRC idle. In 1310, the remote UE may provide an access request to the relay UE, e.g., to establish a relay link for communicating with the gNB. In 1312, the relay UE may accept the access request, including providing various relay link configuration information, such as relay link identification information. The relay UE may provide the remote UE's access information to the gNB, and so in 1314, when the gNB has paging information for the remote UE, it may provide the paging information to the relay UE, during a paging occasion caclulated based on the UE ID of the remote UE. For example, the S-TMSI of the remote UE may be used to calculate the paging occasion on which the gNB provides the paging information for the remote UE to the relay UE. Note that, at least according to some embodiments, it may alternatively be the case that the relay UE does not need to provide the remote UE's access information to the gNB in the scenario illustrated in FIG. 13, e.g., since the paging occasion for providing the paging information for the remote UE may already be calculated based on the remote UE ID. In 1316, it may also be the case that the remote UE can attempt to directly receive the paging information from the gNB, e.g., on a best effort basis. In 1318, during a relay link paging occasion, the relay UE may forward the paging information received from the gNB to the remote UE. The remote UE may monitor the relay link for paging information during the relay link paging occasion, and so the remote UE may receive the paging information (e.g., in case it was not already able to receive the paging information during the remote UE paging occasion on the Uu link). In 1320, when the gNB has paging information for the relay UE, it may provide the paging information to the relay UE, during a paging occasion caclulated based on the UE ID of the relay UE, e.g., which may be a different paging occasion than the paging occasion caclulated based on the UE ID of the remote UE.

Figure 14:
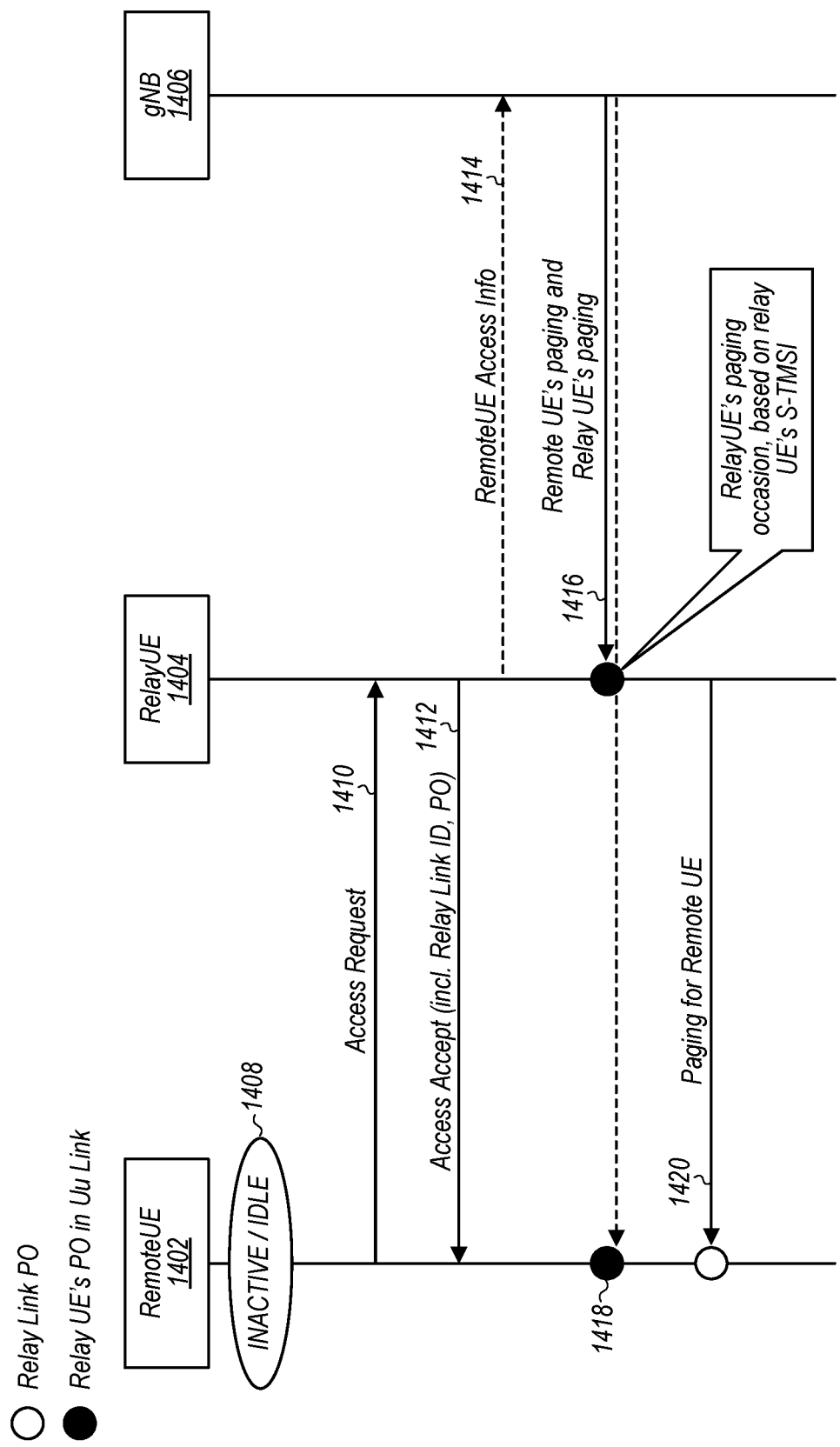

FIG. 14 illustrates aspects of an example scenario in which a relay UE 1404 receives paging for a remote UE 1402 from a gNB 1406 via a Uu link during a paging occasion calculated based on the UE ID of the relay UE 1404, and forwards the paging to the remote UE 1402 via a relay link, according to some embodiments. As shown, in the illustrated scenario, in 1408, the remote UE may be operating in RRC inactive or RRC idle. In 1410, the remote UE may provide an access request to the relay UE, e.g., to establish a relay link for communicating with the gNB. In 1412, the relay UE may accept the access request, including providing various relay link configuration information, such as relay link identification information, and potentially paging occasion information for the relay UE. In 1414, the relay UE may provide the remote UE's access information to the gNB, and so in 1416, when the gNB has paging information for the remote UE, it may provide the paging information to the relay UE, during a paging occasion caclulated based on the UE ID of the relay UE. For example, the S-TMSI of the relay UE may be used to calculate the paging occasion on which the gNB provides the paging information for the remote UE to the relay UE. Note that any paging information for the relay UE may also be provided during the paging occasion caclulated based on the UE ID of the relay UE. In 1418, it may also be the case that the remote UE can attempt to directly receive the paging information from the gNB, e.g., on a best effort basis, if the relay UE provided paging occasion information for the relay UE to the remote UE. In 1420, during a relay link paging occasion, the relay UE may forward the paging information received from the gNB to the remote UE. The remote UE may monitor the relay link for paging information during the relay link paging occasion, and so the remote UE may receive the paging information (e.g., in case it was not already able to receive the paging information during the relay UE paging occasion on the Uu link).

Figure 15:
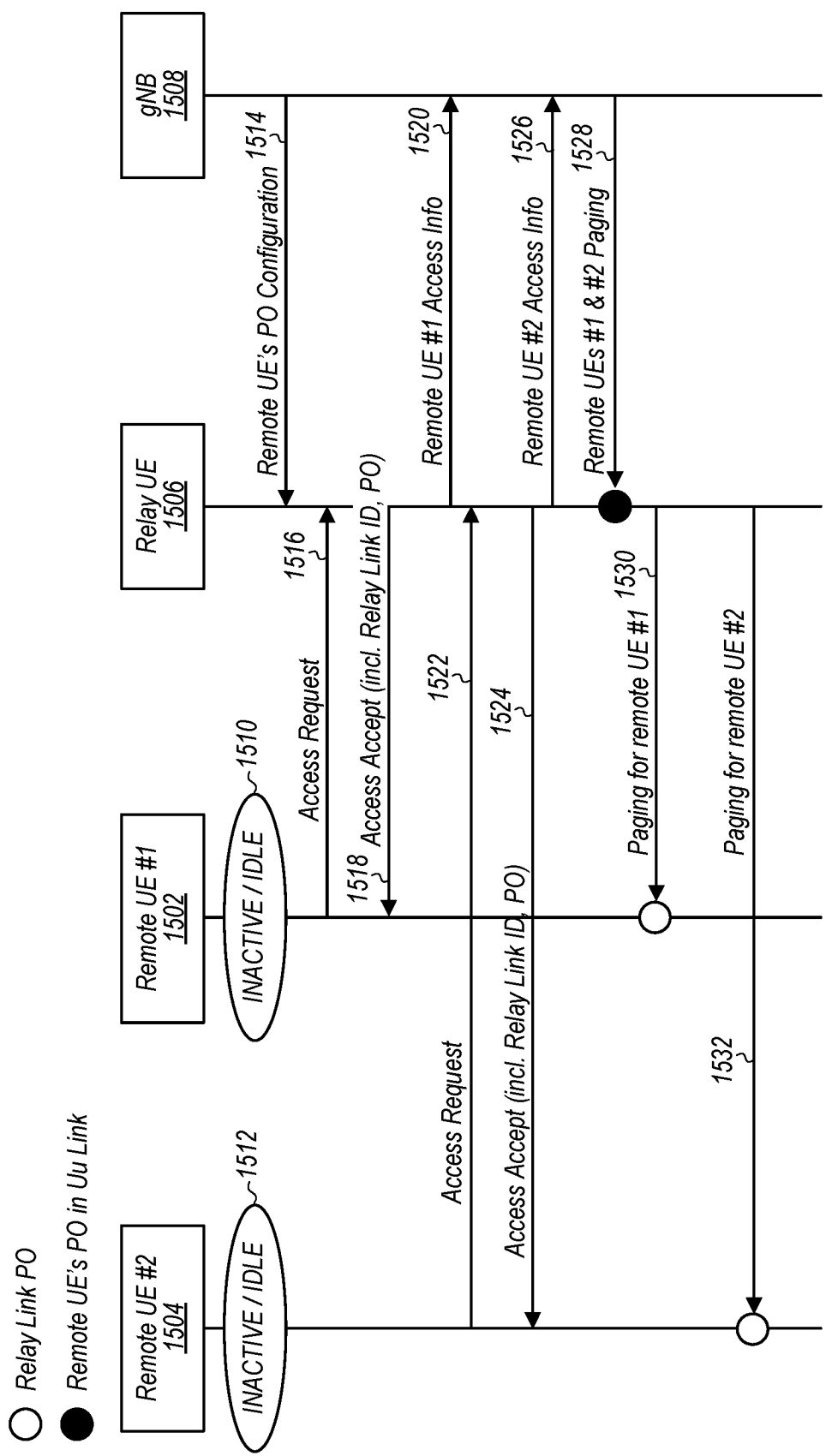

FIG. 15 illustrates aspects of an example scenario in which a relay UE 1506 receives paging for multiple remote UEs 1502, 1504 from a gNB 1508 via a Uu link during a paging occasion configured for receiving paging information for remote UEs, and forwards the paging to the remote UEs 1502, 1504 via relay links with each respective remote UE, according to some embodiments. As shown, in the illustrated scenario, the first remote UE 1502 may be operating in RRC inactive or RRC idle (1510) and the second remote UE 1504 may also be operating in RRC inactive or RRC idle (1512). In 1514, the gNB may provide remote UE paging occasion configuration information to the relay UE, which may configure the paging occasion location(s) at which the gNB will provide paging information for remote UEs to the relay UE (and potentially also to the remote UEs). In 1516, the first remote UE may provide an access request to the relay UE, e.g., to establish a relay link for communicating with the gNB. In 1518, the relay UE may accept the access request, including providing various relay link configuration information, such as relay link identification information, and potentially the configured remote UE paging occasion information. In 1520, the relay UE may provide the first remote UE's access information to the gNB. Similarly, in 1522, the second remote UE may provide an access request to the relay UE, in 1524, the relay UE may accept the access request, and in 1526, the relay UE may provide the second remote UE's access information to the gNB. In 1528, when the gNB has paging information for the first and/or second remote UE, it may provide the paging information to the relay UE, during a paging occasion configured for providing paging information for remote UEs. Note that, if the configured remote UE paging occasion information was provided to the first and/or second remote UE, they may also attempt to directly receive the paging information from the gNB, e.g., on a best effort basis. In 1530, during a relay link paging occasion for the first remote UE, the relay UE may forward any paging information received from the gNB for the first remote UE to the first remote UE. The first remote UE may monitor the relay link for paging information during this relay link paging occasion, and so the first remote UE may receive the paging information (e.g., in case it was not already able to receive the paging information). Similarly, in 1532, during a relay link paging occasion for the second remote UE, the relay UE may forward any paging information received from the gNB for the second remote UE to the second remote UE. The second remote UE may monitor the relay link for paging information during this relay link paging occasion, and so the second remote UE may receive the paging information (e.g., in case it was not already able to receive the paging information). Note that while the remote UEs paging occasions on their respective relay links are illustrated as occurring at different times, it may also be possible that the relay link paging occasions for remote UEs linked to the relay UE could occur at the same time. Note also that according to the approach illustrated in FIG. 15, similar to in the approach illustrated in FIG. 13, it may be the case that the relay UE receives paging messages for the relay UE at a different paging occasion than the paging occasion configured for receiving paging information for remote UEs; for example, though not illustrated in FIG. 15, in the scenario of FIG. 15, it may be the case that the relay UE receives paging messages for the relay UE at a paging occasion calculated based on a UE ID of the relay UE.

Thus, using the techniques described herein, it may be possible for a relay UE to forward paging for a remote UE via a relay link, e.g., including providing techniques for determining when the relay UE starts and stops forwarding the paging in its relay link, which paging messages are forwarded in its relay link, how the relay UE acquires the paging messages to be forwarded from the network, and how the remote UE receives the forwarded paging messages over the relay link, at least according to some embodiments.

In the following further exemplary embodiments are provided.

One set of embodiments may include an apparatus, comprising: a processor configured to cause a relay wireless device to: establish a relay link between the relay wireless device and a remote wireless device; provide an indication of the relay link between the relay wireless device and the remote wireless device to a cellular base station; receive paging information for the remote wireless device from the cellular base station; and provide the paging information to the remote wireless device via the relay link between the relay wireless device and the remote wireless device.

According to some embodiments, the processor is further configured to cause the relay wireless device to: provide paging occasion configuration information for the relay link between the relay wireless device and the remote wireless device to the remote wireless device, wherein the paging information is provided to the remote wireless device during a paging occasion configured according to the paging occasion configuration information for the relay link between the relay wireless device and the remote wireless device.

According to some embodiments, paging occasions between the relay wireless device and the remote wireless device are configured based at least in part on relay link identification information for the relay link between the relay wireless device and the remote wireless device.

According to some embodiments, the paging information for the remote wireless device is received from the cellular base station via dedicated signaling while a radio resource control (RRC) connection is established between the relay wireless device and the cellular base station.

According to some embodiments, the paging information for the remote wireless device is received from the cellular base station during a paging occasion configured based on identification information for the remote wireless device.

According to some embodiments, the paging information for the remote wireless device is received from the cellular base station during a paging occasion configured based on identification information for the relay wireless device.

According to some embodiments, the processor is further configured to cause the relay wireless device to: receive paging occasion configuration information for remote wireless devices from the cellular base station, wherein the paging information for the remote wireless device is received from the cellular base station during a paging occasion configured according to the paging occasion configuration information for remote wireless devices.

According to some embodiments, the processor is further configured to cause the relay wireless device to: provide the paging occasion configuration information for remote wireless devices to the remote wireless device.

According to some embodiments, the processor is further configured to cause the relay wireless device to: establish a second relay link with a second remote wireless device; provide an indication of the second relay link to the cellular base station; receive paging information for the second remote wireless device from the cellular base station; and provide the paging information for the second remote wireless device to the second remote wireless device, wherein the paging information for the second remote wireless device is received from the cellular base station during a paging occasion configured according to the paging occasion configuration information for remote wireless devices.

Another set of embodiments may include a wireless device, comprising: an antenna; a radio operably coupled to the antenna; and a processor operably coupled to the radio; wherein the wireless device is configured to: establish a relay link with a remote wireless device; provide an indication of the relay link to a cellular base station; receive paging information for the remote wireless device from the cellular base station; and provide the paging information to the remote wireless device via the relay link.

According to some embodiments, the wireless device is further configured to: release the relay link with the remote wireless device; provide an indication to the cellular base station that the relay link has been released; and stop monitoring paging for the remote wireless device based at least in part on the relay link having been released.

According to some embodiments, the paging information for the remote wireless device is received from the cellular base station via dedicated signaling while a radio resource control (RRC) connection is established between the wireless device and the cellular base station.

According to some embodiments, the paging information for the remote wireless device is received from the cellular base station during a paging occasion configured based on identification information for the remote wireless device.

According to some embodiments, the paging information for the remote wireless device is received from the cellular base station during a paging occasion configured based on identification information for the wireless device.

According to some embodiments, the wireless device is further configured to: receive paging occasion configuration information for remote wireless devices from the cellular base station, wherein the paging information for the remote wireless device is received from the cellular base station during a paging occasion configured according to the paging occasion configuration information for remote wireless devices.

A further set of embodiments may include a method, comprising: by a first wireless device: establishing a relay link with a second wireless device; providing an indication of the relay link to a cellular base station; receiving paging information for the second wireless device from the cellular base station; and providing the paging information to the second wireless device via the relay link.

According to some embodiments, the method further comprises: providing paging occasion configuration information for the relay link to the second wireless device, wherein the paging information is provided to the second wireless device during a paging occasion configured according to the paging occasion configuration information for the relay link.

According to some embodiments, the paging information for the second wireless device is received from the cellular base station via dedicated signaling while a radio resource control (RRC) connection is established between the first wireless device and the cellular base station.

According to some embodiments, the paging information for the second wireless device is received from the cellular base station during a paging occasion configured based on one of: identification information for the first wireless device; or identification information for the second wireless device.

According to some embodiments, the first wireless device is further configured to: receive paging occasion configuration information for remote wireless devices from the cellular base station, wherein the paging information for the second wireless device is received from the cellular base station during a paging occasion configured according to the paging occasion configuration information for remote wireless devices.

Still another embodiment may include a method, comprising: by a remote wireless device: establishing a relay link with a relay wireless device, wherein the relay link is configured to provide the remote wireless device with access to a cellular base station via the relay wireless device; and receiving paging information from the relay wireless device, wherein the paging information includes information that is relayed from the cellular base station to the remote wireless device by the relay wireless device.

Yet another exemplary embodiment may include a method, comprising: by a wireless device: performing any or all parts of the preceding examples.

Another exemplary embodiment may include a wireless device, comprising: an antenna; a radio coupled to the antenna; and a processing element operably coupled to the radio, wherein the device is configured to implement any or all parts of the preceding examples.

Still another exemplary embodiment may include an apparatus, comprising: a processing element configured to cause a wireless device to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising:
    circuitry, the circuitry configured to:
    establish a relay link between a relay wireless device and a remote wireless device;
    provide access information of the remote wireless device to a cellular base station;
    receive, in a dedicated radio resource control (RRC) message from the cellular base station to the relay wireless device, paging information for the remote wireless device;
    provide paging occasion configuration information for the relay link between the relay wireless device and the remote wireless device to the remote wireless device, wherein paging occasions between the relay wireless device and the remote wireless device are configured based at least in part on relay link identification information for the relay link between the relay wireless device and the remote wireless device; and
    provide the paging information to the remote wireless device via the relay link between the relay wireless device and the remote wireless device, wherein the paging information is provided to the remote wireless device during a paging occasion configured according to the paging occasion configuration information for the relay link between the relay wireless device and the remote wireless device.

2. The processor of claim 1,
    wherein the paging information for the remote wireless device is received from the cellular base station during a paging occasion configured based on identification information for the remote wireless device.

3. The processor of claim 1,
    wherein the paging information for the remote wireless device is received from the cellular base station during a paging occasion configured based on identification information for the relay wireless device.

4. The processor of claim 1, wherein the circuitry is further configured to:
    receive paging occasion configuration information for remote wireless devices from the cellular base station,
    wherein the paging information for the remote wireless device is received from the cellular base station during a paging occasion configured according to the paging occasion configuration information for remote wireless devices.

5. The processor of claim 4, wherein the circuitry is further configured to:
    provide the paging occasion configuration information for remote wireless devices to the remote wireless device.

6. The processor of claim 4, wherein the circuitry is further configured to:
    establish a second relay link with a second remote wireless device;
    provide an indication of the second relay link to the cellular base station;
    receive paging information for the second remote wireless device from the cellular base station; and
    provide the paging information for the second remote wireless device to the second remote wireless device,
    wherein the paging information for the second remote wireless device is received from the cellular base station during a paging occasion configured according to the paging occasion configuration information for remote wireless devices.

7. A method, comprising:
    establish a relay link between a relay wireless device and a remote wireless device;
    provide access information of the remote wireless device to a cellular base station;
    receive, in a dedicated radio resource control (RRC) message from the cellular base station to the relay wireless device, paging information for the remote wireless device;

provide paging occasion configuration information for the relay link between the relay wireless device and the remote wireless device to the remote wireless device, wherein paging occasions between the relay wireless device and the remote wireless device are configured based at least in part on relay link identification information for the relay link between the relay wireless device and the remote wireless device; and provide the paging information to the remote wireless device via the relay link between the relay wireless device and the remote wireless device, wherein the paging information is provided to the remote wireless device during a paging occasion configured according to the paging occasion configuration information for the relay link between the relay wireless device and the remote wireless device.

8. The method of claim 7,
wherein the paging information for the remote wireless device is received from the cellular base station during a paging occasion configured based on identification information for the remote wireless device.

9. The method of claim 7,
wherein the paging information for the remote wireless device is received from the cellular base station during a paging occasion configured based on identification information for the relay wireless device.

10. The method of claim 7, further comprising:
receive paging occasion configuration information for remote wireless devices from the cellular base station, wherein the paging information for the remote wireless device is received from the cellular base station during a paging occasion configured according to the paging occasion configuration information for remote wireless devices.

11. The method of claim 10, further comprising:
provide the paging occasion configuration information for remote wireless devices to the remote wireless device.

12. The method of claim 10, further comprising:
establish a second relay link with a second remote wireless device;
provide an indication of the second relay link to the cellular base station;
receive paging information for the second remote wireless device from the cellular base station; and
provide the paging information for the second remote wireless device to the second remote wireless device,
wherein the paging information for the second remote wireless device is received from the cellular base station during a paging occasion configured according to the paging occasion configuration information for remote wireless devices.

13. A relay wireless device, comprising:
a radio; and
circuitry, the radio and the circuitry configured to:
establish a relay link between a relay wireless device and a remote wireless device;
provide access information of the remote wireless device to a cellular base station;
receive, in a dedicated radio resource control (RRC) message from the cellular base station to the relay wireless device, paging information for the remote wireless device;
provide paging occasion configuration information for the relay link between the relay wireless device and the remote wireless device to the remote wireless device, wherein paging occasions between the relay wireless device and the remote wireless device are configured based at least in part on relay link identification information for the relay link between the relay wireless device and the remote wireless device; and
provide the paging information to the remote wireless device via the relay link between the relay wireless device and the remote wireless device, wherein the paging information is provided to the remote wireless device during a paging occasion configured according to the paging occasion configuration information for the relay link between the relay wireless device and the remote wireless device.

14. The relay wireless device of claim 13, wherein the paging information for the remote wireless device is received from the cellular base station during a paging occasion configured based on identification information for the remote wireless device.

15. The relay wireless device of claim 13, wherein the radio and the circuitry are further configured to:
receive paging occasion configuration information for remote wireless devices from the cellular base station, wherein the paging information for the remote wireless device is received from the cellular base station during a paging occasion configured according to the paging occasion configuration information for remote wireless devices.

16. The relay wireless device of claim 13,
wherein the paging information for the remote wireless device is received from the cellular base station during a paging occasion configured based on identification information for the remote wireless device.

* * * * *